(No Model.)
C. A. BACKSTROM.
COUNTER SHAFT.
No. 363,447. Patented May 24, 1887.
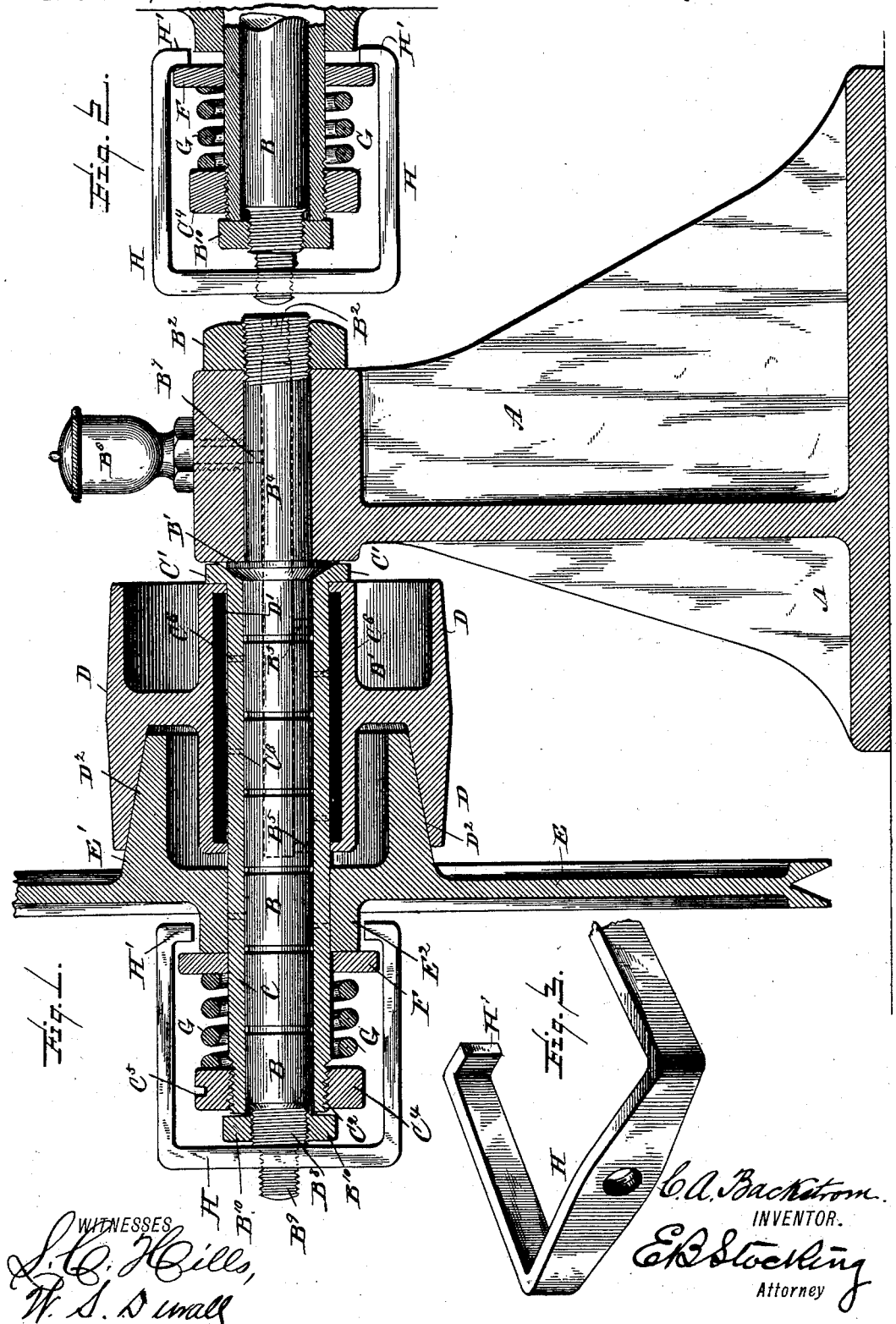
WITNESSES
C. A. Backstrom
INVENTOR.
Attorney

UNITED STATES PATENT OFFICE.

C. AXEL BACKSTROM, OF TRENTON, ASSIGNOR TO THE BACKSTROM CENTRIFUGAL SEPARATOR COMPANY, OF CAMDEN, NEW JERSEY.

COUNTER-SHAFT.

SPECIFICATION forming part of Letters Patent No. 363,447, dated May 24, 1887.

Application filed September 25, 1886. Serial No. 214,555. (No model.)

*To all whom it may concern:*

Be it known that I, C. AXEL BACKSTROM, a citizen of the United States, residing at Trenton, in the county of Mercer and State of New Jersey, have invented certain new and useful Improvements in Counter-Shafts; and I do hereby declare the following to be a full, clear, and exact description of the invention, such as will enable others skilled in the art to which it appertains to make and use the same.

This invention has relation to counter-shafts or any other class of shafts and pulleys which are intended for the conveyance of power from a motor to a machine, and which are located between the motor and the machine.

The general purpose of this invention is for employment in running any machinery in which a high speed of motion is required—as, for example, centrifugal machines.

The invention, however, is applicable for use in connection with any class of machines where the speed is not high, and where it may be desirable to intermittently operate the same, in which latter case the invention may be used after the manner of an ordinary clutch.

The principal object of the invention is to reduce to a minimum the power required to operate the counter-shaft itself. Heretofore in this class of mechanisms the force exerted to bind the parts in operative position has acted to produce increased friction between the moving parts, and, secondly, an increase of the power required to drive the same.

By my construction the separable parts of the mechanism, which are manipulated as hereinafter described to convey from one to the other the driving-power, are so constructed, arranged, and combined that the force required to bind said separable parts operatively together cannot in any possible manner operate to increase the friction or pressure of the moving parts upon each other, or increase or consume the power required to operate the same and the driven machine, and hence the resistance to be overcome by the driving-power remains unaltered, and is reduced in amount to that produced simply and solely by the weight of the parts themselves upon the shaft which supports them.

Other objects and advantages of the invention will appear in the following description, and the novel features thereof will be particularly pointed out in the claims.

Referring to the drawings, Figure 1 is a central vertical section of a counter-shaft constructed in accordance with my invention, the separable parts being represented as in operative contact. Fig. 2 is a like view showing the position certain elements assume when the separable parts are in non-operative position. Fig. 3 is a perspective of the releasing-yoke.

Like letters of reference indicate like parts in all the figures of the drawings.

A represents any suitable standard, column, or support for the shaft B, on which is mounted the power receiving and conveying devices. The shaft B in this instance is provided with an annular collar or shoulder, B', and is screw-threaded and provided with a nut, $B^2$, for binding the same non-rotatively or rigidly in the column A. In this instance I also provide a screw-threaded plug, $B^3$, for closing an oil-chamber, $B^4$, extending into the shaft, and provided with oil-ducts $B^5$, leading to the periphery of the shaft. Any suitable oil-receptacle, $B^6$, is mounted upon the standard, and communicates by an oil-duct, $B^7$, with the oil-chamber of the shaft. Oil-ducts $C^6$ are formed in the sleeve to convey oil to the outer surface thereof, where the wheel and pulley rotate thereon. The periphery of the shaft is, as shown, provided with oil-grooves. The opposite end of the shaft B is screw-threaded in this instance in two sizes, $B^8$ $B^9$. A nut, $B^{10}$, is fitted to the screw-thread $B^8$.

C represents a sleeve freely mounted on the shaft, and extending from the collar or the standard to the nut $B^{10}$. I deem it proper to state at this point that the thread $B^8$ may be extended to the end of the shaft in one size, and that the collar B' may be omitted and the shaft screw-threaded bodily into the standard, in which case the sleeve would be arranged adjacent to the standard, but having such relations thereto and to the nut $B^{10}$ that no appreciable resistance to the free rotation of the sleeve upon the shaft would be offered by either the nut $B^{10}$ or the standard.

Upon the sleeve C, and at one end thereof, I form a shoulder, C', and at the opposite end thereof an external screw-thread, $C^2$, upon which is mounted an interiorly-screw-threaded collar, $C^4$. The collar $C^4$ is provided with apertures $C^5$, for the reception of a pin or lever for moving the same upon its thread; or it may be provided with any suitable wrench-hold.

Upon the sleeve C is loosely mounted a driving-pulley, D, which may or may not be provided with a Babbitt bearing, as shown. One side of the pulley is interiorly cone-shaped, as at $D^2$, for the reception of a cone, E′, formed upon the driving-wheel E, which in this instance is circumferentially grooved for the reception of a belt. Upon the opposite side of the driving-wheel E to that on which the cone E′ is arranged is formed a hub, $E^2$. The driving-wheel is also loosely mounted upon the sleeve C.

Between the screw-threaded collar $C^4$ and the driving-wheel is arranged a loose washer, F, and between the collar $C^4$ and the washer F, and encircling the sleeve C, I arrange a coiled or other spring, G.

Upon the extreme end of the shaft B, I mount a yoke, H, in this instance by interiorly screw-threading the same to fit the thread $B^9$ on the shaft; or, as heretofore indicated, it may be to fit the thread $B^{10}$ thereof. The arms of the yoke H are turned inwardly, as at H′, to include or embrace the washer F.

This being the construction, the operation of my invention is as follows: Power being conveyed from any prime motor to the pulley D, will cause the same to rotate upon the sleeve C when not otherwise affected. Now, when the driving-wheel E is forced by any means toward the pulley D, the cone E′ binds within the cone $D^2$ of the pulley, and the motion of the pulley by friction of the parts is conveyed to the wheel and from thence to the machine to be driven. At this point of my description the disadvantages of constructions heretofore employed can be clearly set forth. In forcing the wheel E and its cone into the pulley D to produce the necessary friction to convey the motion of the pulley to the wheel there is a forcible end-thrust produced in the pulley, which must be resisted at the end thereof. Ordinarily, the resistance to the end-thrust is provided in a collar on the shaft or in the adjacent surface of the standard, both of which are fixed. This resistance, together with an equal resistance in the means employed for forcing the cone in the pulley, consumes a material part of the power required to drive the machine. I overcome this waste of power caused by the end-thrust described by providing a shouldered sleeve, which takes all of the end-thrust and that without producing any end-thrust of the sleeve itself against the collar or the standard, whereby said sleeve runs as freely upon the shaft as when the end-thrust does not exist in the pulley.

The means which I employ for the purpose of forcing the driving-wheel cone within the pulley consist of the washer F, spring G, and collar $C^4$. While I do not limit my invention to the employment of a spring in the device employed for the purpose stated, still I secure an important advantage by its use, especially in any class of machines which require a uniform motion, or which require a gradual easy starting. Both of these requirements exist in centrifugal machines, in that it is desirable to start the same smoothly, and to approach its desired maximum speed or rotation gradually and to maintain the same. These particular objects are obtained by the means employed, in that, the speed of rotation of the pulley as driven by the prime motor being ascertained, the collar $C^4$ is caused to compress the spring against the washer F, so that a desired pressure is exerted by the spring, which being resisted by the relatively fixed collar acts to move the loose washer and the wheel E, against the hub of which the washer bears along the sleeve and the cone of the wheel into the cone of the pulley. It is apparent that in this manner the amount of force or the degree of pressure of the cone of the driving-wheel upon that of the driving-pulley may be regulated, so that the friction produced in the cones shall be sufficient to produce and maintain a desired number of revolutions of the driving-wheel. With the spring adjusted to a desired tension, it is apparent that in starting the machine the motion of the driving-pulley D will be gradually transmitted to the driving-wheel until it arrives in speed to the maximum desired, when it will be uniformly continued.

When it is desired to stop the revolution of the driving-wheel, the yoke H, which does not revolve with the shaft, is run outwardly along the thread of the shaft until its inwardly-turned arms H′ come into contact with the washer F, when, by continuing the rotation of the yoke, said washer is drawn toward the end of the shaft, compressing the spring and relieving the force or pressure which the spring has exerted upon the driving-wheel, whereby the frictional contact of the cones is broken so that the driving-wheel comes to a standstill, while the driving-pulley may continue its rotation upon the sleeve.

Having described my invention and its operation, what I claim is—

1. The combination of a shaft, a sleeve loosely mounted thereon, a driving-pulley and a driving-wheel loosely mounted upon the sleeve, and having frictional contact-surfaces, and a device for forcing the wheel and the pulley into frictional contact, substantially as specified.

2. The combination of a shaft, a sleeve loosely mounted thereon, a driving-pulley and a driving-wheel loosely mounted upon the sleeve, and having frictional contact-surfaces, and devices for yieldingly forcing the wheel into frictional contact with the pulley, substantially as specified.

3. The combination of a shaft, a sleeve loosely mounted thereon, a driving-pulley and a driving-wheel loosely mounted upon the sleeve and having frictional contact-surfaces, and a device, such as the washer F, loosely mounted and longitudinally movable upon the sleeve and against the driving-wheel, and mechanism for moving the washer upon the sleeve, substantially as specified.

4. The combination of a shaft, a sleeve loosely mounted thereon, a driving-pulley and a driving-wheel mounted loosely upon the sleeve and having frictional contact-surfaces, a washer loosely mounted upon the sleeve, a collar rigidly secured to the sleeve, and an interposed spring, substantially as specified.

5. The combination of a shaft, a sleeve loosely mounted thereon, a driving-pulley and a driving-wheel loosely mounted upon the sleeve and having frictional contact-surfaces, a washer mounted for longitudinal movement on the sleeve, and a yoke mounted for longitudinal movement on the shaft, and means, substantially as described, for forcing the washer and drive-wheel against the driving-pulley, substantially as specified.

6. The combination, with a standard, of a shaft non-rotatably mounted thereon and provided with an oil-chamber with oil-ducts, a sleeve mounted loosely upon the shaft and provided with oil-ducts, and a driving-pulley and driving-wheel mounted loosely upon the sleeve, and means, substantially as described, for forcing the wheel into surface contact with the pulley, substantially as specified.

In testimony whereof I affix my signature in presence of two witnesses.

C. AXEL BACKSTROM.

Witnesses:
B. F. MORSELL,
W. S. DUVALL.